US008274423B2

(12) United States Patent
Venkatachalam et al.

(10) Patent No.: US 8,274,423 B2
(45) Date of Patent: Sep. 25, 2012

(54) SENSITIVITY ENHANCEMENT SYSTEM

(75) Inventors: Chandrasekaran Venkatachalam, Fort Collins, CO (US); Cuong M. Nguyen, Fort Collins, CO (US); Nitin Bharadwaj, Richland, WA (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 12/908,657

(22) Filed: Oct. 20, 2010

(65) Prior Publication Data

US 2011/0102250 A1 May 5, 2011

Related U.S. Application Data

(60) Provisional application No. 61/253,407, filed on Oct. 20, 2009, provisional application No. 61/253,371, filed on Oct. 20, 2009.

(51) Int. Cl.
*G01S 13/00* (2006.01)
(52) U.S. Cl. ...................... 342/26 R; 342/159
(58) Field of Classification Search .............. 342/26 R, 342/159
See application file for complete search history.

(56) References Cited

U.S. PATENT DOCUMENTS

| | | | |
|---|---|---|---|
| 5,465,413 A | 11/1995 | Enge et al. | |
| 5,583,512 A | 12/1996 | Mceligot | |
| 6,377,204 B1 | 4/2002 | Wurman et al. | |
| 6,522,456 B2 | 2/2003 | Chen et al. | |
| 7,103,026 B2 | 9/2006 | Hall et al. | |
| 7,248,207 B2 | 7/2007 | Ohnishi | |
| 7,518,544 B2 | 4/2009 | Venkatachalam et al. | |
| 2006/0187114 A1* | 8/2006 | Gibson et al. ............... | 342/195 |
| 2006/0273952 A1* | 12/2006 | Krikorian et al. ............ | 342/198 |
| 2007/0046526 A1 | 3/2007 | O'Hora et al. | |
| 2007/0229347 A1 | 10/2007 | Holmberg | |
| 2008/0059098 A1 | 3/2008 | Zhang | |
| 2009/0237292 A1 | 9/2009 | Tigrek et al. | |
| 2009/0289836 A1* | 11/2009 | Frank et al. ................. | 342/189 |
| 2011/0102249 A1 | 5/2011 | Venkatachalam et al. | |

OTHER PUBLICATIONS

Ackroyd, M. et al., Optimum mismatched filters for sidelobe suppression. *Aerospace and Electronic System, IEEE Transaction on AES*,1973, pp. 9, 214-218.

Hansen, P. C., 1992: Analysis of discrete ill-posed problems by means of the L-Curve. SIAM Review, 34, pp. 561-580.

Mudukutore, A. S.,et al., Pulse compression for weather radars, IEEE Transaction on Geoscience and Remote Sensing, 1998, vol. 36, No. 1, pp. 125-142.

Petersen, D. P. et al., Sampling and reconstruction of wave-number limited functions in N-dimensional euclidean spaces. information and Control, 1962, 5, 279-323.

International Search Report and Written Opinion of PCT/US2010/053424 mailed on Dec. 21, 2010, 9 pages.

International Search Report and Written Opinion of PCT/US2010/053394 mailed on Dec. 10, 2010, 8 pages.

* cited by examiner

*Primary Examiner* — Timothy A Brainard
(74) *Attorney, Agent, or Firm* — Kilpatrick Townsend & Stockton LLP

(57) ABSTRACT

Sensitivity is a critical aspect of weather radar systems. Such systems not only detect atmospheric patterns but often need to precisely measure weak precipitation echoes. Embodiments of the invention use pulse compression techniques to increase the sensitivity of weather radar systems. These techniques can include sending two waveforms into a region of interest, where the second waveform is designed based on knowledge about the first waveform. Such systems can enhance the sensitivity of weather radars about 10 dB.

20 Claims, 16 Drawing Sheets

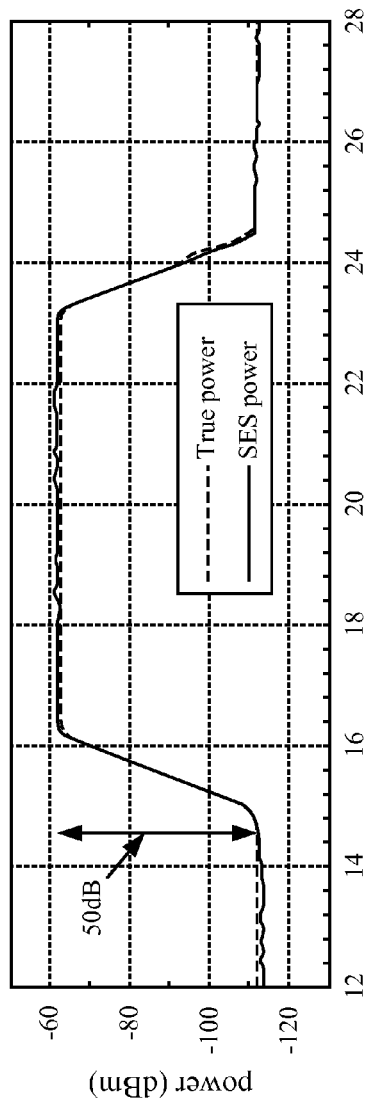
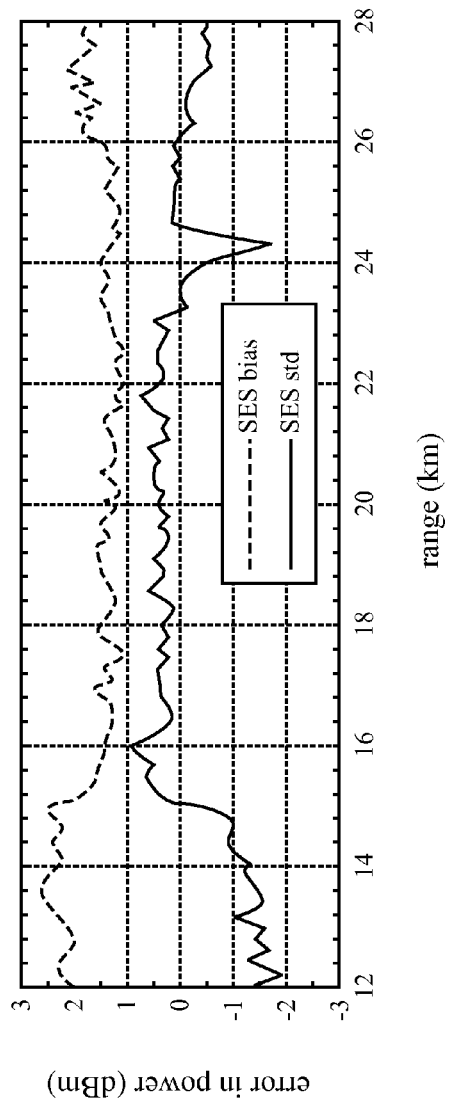
Figure 9A
Figure 9B

SENSITIVITY ENHANCEMENT SYSTEM

CROSS-REFERENCE TO RELATED APPLICATIONS

This application is a non-provisional of, and claims the benefit of, U.S. Provisional Patent Application Ser. No. 61/253,407, entitled "Sensitivity Enhancement System," filed Oct. 20, 2009, and U.S. Provisional Patent Application Ser. No. 61/253,371, entitled "Resolution Enhancement System For Networked Radars," filed Oct. 20, 2009, the entire disclosures of which are incorporated herein by reference for all purposes.

STATEMENT AS TO RIGHTS TO INVENTIONS MADE UNDER FEDERALLY SPONSORED RESEARCH OR DEVELOPMENT

This invention was made with Government support under National Science Foundation Award Number 0313747. The government has certain rights in the invention.

BACKGROUND

One of the fundamental objectives of meteorological radar systems is to sample the atmosphere surrounding the Earth to provide a quantitative measure of precipitation. Conventional meteorological radars provide coverage over long ranges, often on the order of hundreds of kilometers. A general schematic of how such conventional radar systems function is provided in FIG. 1. In this illustration, a radar is disposed at the peak of a raised geographical feature such as a hill or mountain 104. The radar generates an electromagnetic beam 108 that disperses approximately linearly with distance, with the drawing showing how the width of the beam 108 thus increases with distance from the radar. Various examples of weather patterns 116 that might exist and which the system 100 attempts to sample are shown in different positions above the surface 112 of the Earth.

BRIEF SUMMARY

Sensitivity is a critical aspect of weather radar systems. Such systems not only detect atmospheric patterns but often need to precisely measure weak precipitation echoes. Embodiments of the invention use pulse compression techniques to increase the sensitivity of weather radar systems. These techniques can include sending two waveforms into a region of interest, where the second waveform is designed based on knowledge about the first waveform. Such systems can enhance the sensitivity of weather radars about 10 dB.

Embodiments of the invention include a weather radar system that includes a transmitter, a receiver and a computer system. The transmitter can be configured to transmit a first signal and a second signal into a region of interest. The receiver can be configured to receive first echoes and second echoes scattered from the region of interest. The first echoes can correspond with the first transmitted signal and the second echoes can correspond with the second transmitted signal. The computer system can be coupled at least with the receiver and can be configured to filter the second echoes based on information about either or both the first waveform and the first echoes.

In some embodiments, the first and second waveforms comprise pulse compression waveforms. In some embodiments, the first waveform and the second waveform can be transmitted at the same time and in different in frequency. In other embodiments, the first waveform and the second waveform can be transmitted at different times and they are different in time. In some embodiments, the second waveform can be adaptively filtered based on information about the first waveform. And in some embodiments, the second waveform can be filtered based on the power of the first waveform and/or the Doppler profiles of the first waveform. In some embodiments, an iterative loop can use the outputs of the second wave form as a reference profile to filter the second waveform itself. In some embodiments, the adaptive filter can comprise: $F=(S_m^H R_{zz}^{-1} S_m + R_{xx}^{-1})^{-1} S_m^H R_{zz}^{-1}$.

In some embodiments, a method is provided for increasing the sensitivity of a radar system. The method can include transmitting a first waveform into the atmosphere from a weather radar system and transmitting a second waveform, different from the first waveform, into the atmosphere from the weather radar system. Echoes can be received from the atmosphere in response to the first waveform and the second waveform. And the echoes of the second waveform can be filtered based on information about either or both the first waveform and the echoes from the first waveform.

The following detailed description, together with the accompanying drawings, will provide a better understanding of the nature and advantage of the embodiments disclosed herein.

BRIEF DESCRIPTION OF THE DRAWINGS

FIG. 9A shows a graph of a trapezoid shape profile for both true and SES power according to some embodiments of the invention.

FIG. 9B shows a graph of the bias and standard deviation of SES power according to some embodiments of the invention.

DETAILED DESCRIPTION

Sensitivity is a critical aspect of any radar system. It is especially important for weather radars because such systems not only detect atmospheric patterns but often need to precisely measure weak precipitation echoes. Although application of pulse compression techniques for weather radars is not widely used, for low power systems it can be beneficial. However, conventional matched or mismatched filters used along with pulse compression techniques have some constraints that partly downgrade the sensitivity. Embodiments of the invention, broadly termed sensitivity enhancement systems (SES), can obtain a better sensitivity than the other systems. For instance, SES with dual-waveforms scheme is able to enhance the sensitivity about 10 dB. It also provides good performance in PSL, Doppler tolerant and dual-polarization parameter estimation. For region with strong echoes, results by the two waveforms can be combined to improve measurement accuracy.

Pulse compression techniques are used through embodiments of the invention. Such systems transmit long coded waveforms by a weather radar into the atmosphere. The echoes are received and compression techniques are applied to narrow the pulses. Coded pulses can be useful because they require less power while maintaining increased bandwidth. Moreover, the range resolution and/or sensitivity of weather radars can be improved using these embodiments. The increased bandwidth, however, can have a major drawbacks: system noise. Because noise is proportional to bandwidth the increase in bandwidth can also increase the noise. With the increased noise, system sensitivity decreases. Moreover, the use of a low pass filter cannot be used in ground based weather radars to mitigate noise because the natural properties of the wideband echoes and white noise increase filter loss ruining any gains from the codes.

In some embodiments, a two waveform scheme can be used. That is, two waveforms can be transmitted separately in either time and/or frequency. Then, at the receiver an adaptive filter can be designed based on the self consistency of these two waveforms. For example, the adaptive filter can filter the second waveform based on the first waveform and/or the echo from the first waveform. As another example, the adaptive filter can filter each range gate based on the prior knowledge of the power profile from the alternate waveform. Using embodiments of the invention can improve the system sensitivity and the peak sidelobe level (PSL) of the return echoes.

Figure 1:
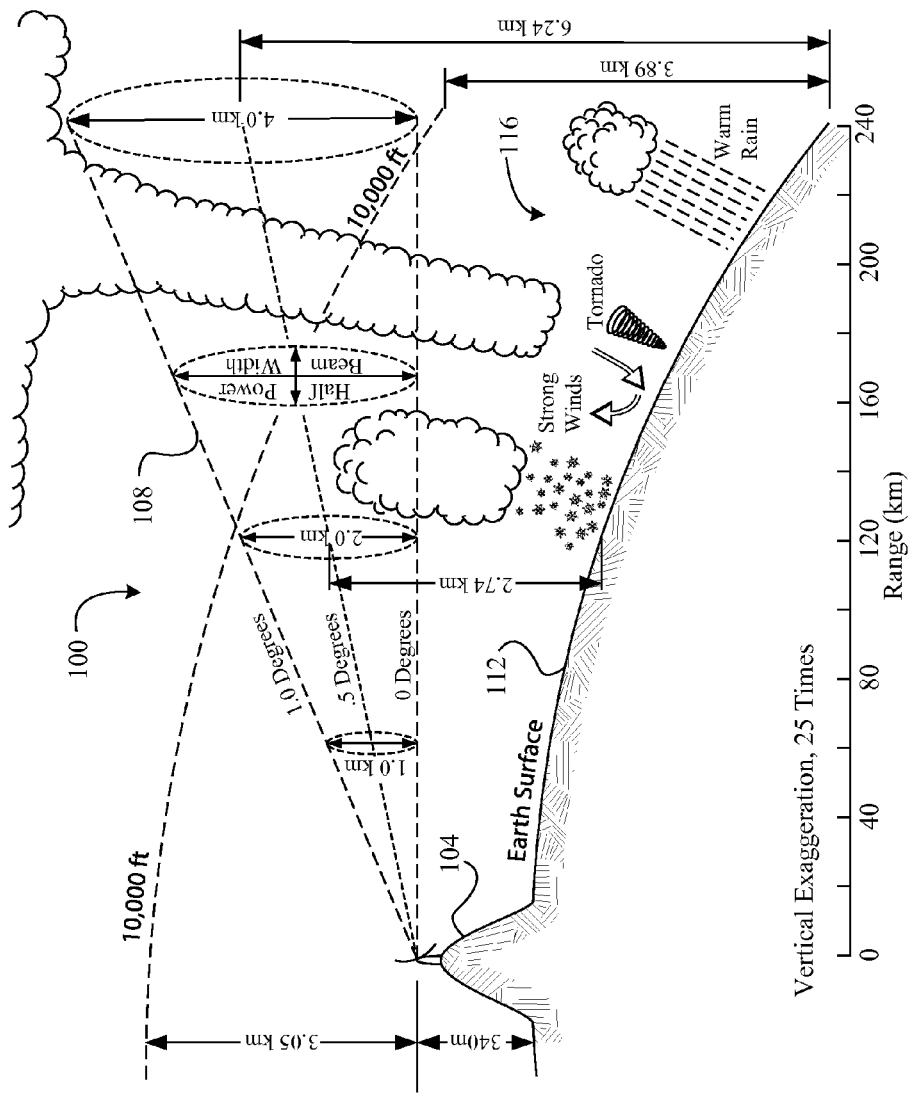
FIG. 1 provides a schematic illustration of the operation of a conventional radar system (reproduced from the National Academy of Sciences Report, "Flash flood forecasting over complex terrain").
Figure 2:
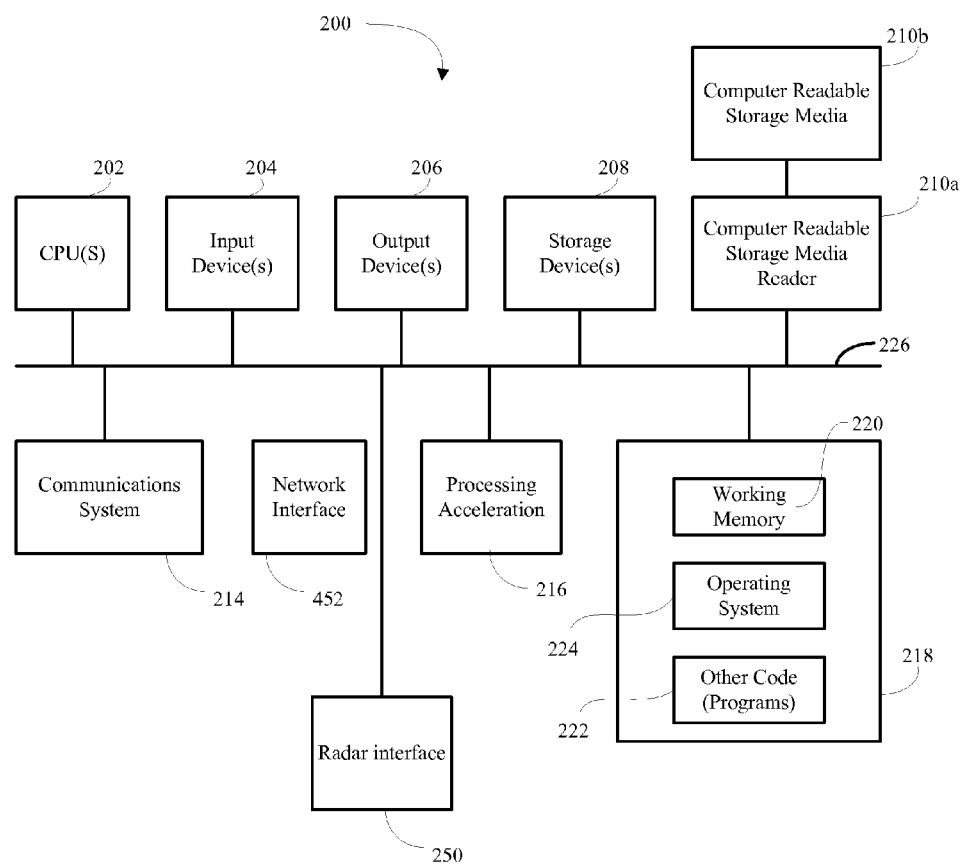
FIG. 2 shows a simplified block diagram of a computational system that can be used to implement embodiments of the invention.

FIG. 2 shows a simplified block diagram of a computer system 200 that can be coupled with a radar system that implements various embodiments of the invention. Computer system 200 can be used to perform any or all the steps shown in FIG. 6 and/or FIG. 7. Moreover, computer system 200 can perform any or all the mathematical computations disclosed here. The drawing illustrates how individual system elements can be implemented in a separated or more integrated manner. The computer 200 is shown having hardware elements that are electrically coupled via bus 226. Network interface 252 can communicatively couple the computational device 200 with another computer, for example, through a network such as the Internet. The hardware elements can include a processor 202, an input device 204, an output device 206, a storage device 208, a computer-readable storage media reader 210a, a communications system 214, a processing acceleration unit 216 such as a DSP or special-purpose processor, and memory 218. The computer-readable storage media reader 210a can be further connected to a computer-readable storage medium 210b, the combination comprehensively representing remote, local, fixed, and/or removable storage devices plus storage media for temporarily and/or more permanently containing computer-readable information.

Radar interface 250 is coupled with bus 226. In some embodiments, radar interface 250 can be any type of communication interface. For example, radar interface 250 can be a USB interface, UART interface, serial interface, parallel interface, etc. Radar interface 250 can be configured to couple directly with any type of radar system such as a dual polarization radar system.

The computer system 200 also comprises software elements, shown as being currently located within working memory 220, including an operating system 224 and other code 222, such as a program designed to implement methods and/or processes described herein. In some embodiments, other code 222 can include software that provides instructions for receiving user input a dual polarization radar system and manipulating the data according to various embodiments disclosed herein. In some embodiments, other code 222 can include software that can predict or forecast weather events, and/or provide real time weather reporting and/or warnings. It will be apparent to those skilled in the art that substantial variations can be used in accordance with specific requirements. For example, customized hardware might also be used and/or particular elements might be implemented in hardware, software (including portable software, such as applets), or both. Further, connection to other computing devices such as network input/output devices can be employed.

A pulse compression radar system can have a chirp frequency of $F_s$. The sampling time is then $$T_s = \frac{1}{F_s}.$$

Figure 3:
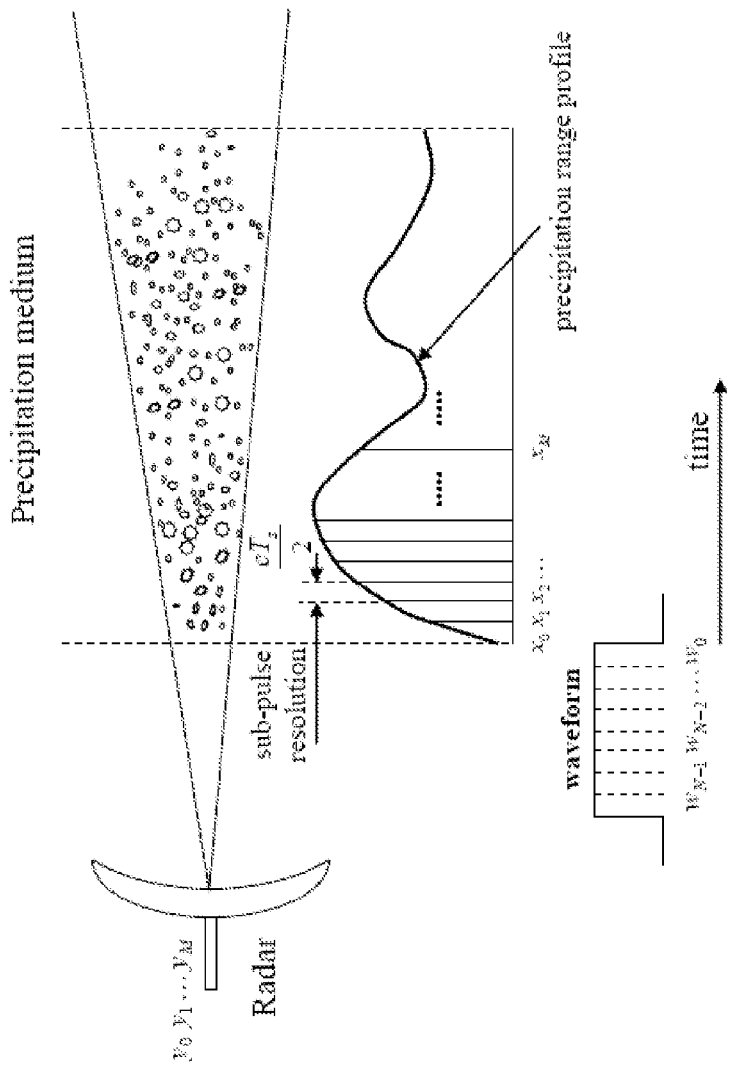
FIG. 3 shows an illustration of the discrete signal model according to some embodiments of the invention.

The range resolution correspond to the sub-pulse is $$r = \frac{cT_s}{2},$$

where c is the speed of light in a vacuum. For example, a system with a 5 MHz chirp gives a pulse range resolution of 30 m. FIG. 3 shows a signal transmission model where both precipitation range profile and transmitted waveforms are sampled at frequency $F_s$. The range profile can then be represented by a vector of contiguous samples $x=[x_0, x_1, \ldots, x_M, \ldots]$, where $x_i$ is the signal from the $i^{th}$ range gate. The received signal is a convolution of the medium and the transmitted waveform. If $w=[w_0, w_1, \ldots, w_{N-1}]$ is the N-length vector of the sampled waveform, then the received signal at the antenna can be expressed as y=x*w+η, where (*) denotes the convolution operator and η is the noise vector.

The convolution of y can be written in matrix form, $$\begin{bmatrix} y_0 \\ y_1 \\ y_2 \\ \vdots \\ y_{M-1} \\ y_M \end{bmatrix} = \begin{bmatrix} x_0 & 0 & \cdots & 0 \\ x_1 & x_0 & \cdots & 0 \\ x_2 & x_1 & \cdots & 0 \\ \vdots & \vdots & \ddots & \vdots \\ x_{M-1} & x_{M-2} & \cdots & x_{M-N} \\ x_M & x_{M-1} & \cdots & x_{M-N+1} \end{bmatrix} \begin{bmatrix} w_0 \\ w_1 \\ w_2 \\ \vdots \\ w_{N-1} \end{bmatrix} + \begin{bmatrix} \eta_0 \\ \eta_1 \\ \eta_2 \\ \vdots \\ \eta_{M-1} \\ \eta_M \end{bmatrix}.$$

For n≧N−1 we define a processing window [n−N+1, n+N−1] as, $$\begin{bmatrix} y_n \\ y_{n+1} \\ \vdots \\ y_{n+N-1} \end{bmatrix} = \begin{bmatrix} x_n & x_{n-1} & \cdots & x_{n-N+1} \\ x_{n+1} & x_n & \cdots & x_{n-N+2} \\ \vdots & \vdots & \ddots & \vdots \\ x_{n+N-1} & x_{n+N-2} & \cdots & x_n \end{bmatrix} \begin{bmatrix} w_n \\ w_{n+1} \\ \vdots \\ w_{n+N-1} \end{bmatrix} + \begin{bmatrix} \eta_n \\ \eta_{n+1} \\ \vdots \\ \eta_{n+N-1} \end{bmatrix}.$$

Or in short notation, $$y_n = X_n w + \eta_n,$$

Where $\eta_n$ is the noise vector within the processing window. It can be assumed that $\eta_n \approx N(0, \sigma_N^2, I_n)$ with $\sigma_N^2$ as the noise power and $I_n$ is the identity matrix.

Minimization of integrated sidelobe level (ISL) is an efficient technique to design a mismatched receiver filter. ISL trades range resolution to peak sidelobe level (PSL). Given a signal model where the input signal is an impulse, and the output signal is convolution of the transmit waveform and the receiver filter; by pre-defining output resolution, compressed peaks are removed and the remainders are sidelobes. The minimization process gives a closed form solution for the case of minimum ISL. Though not providing the best range resolution for the output, a minimum ISL filter provides sufficiently low PSL. This design can be suitable for the first waveform of SES, in some embodiments, where the need of PSL is more important than the achieved resolution. For example, minimum ISL receiver filter for a non-linear piecewise FM waveform with B=4 MHz, T=40 μs can provide an output with 90 m resolution and PSL less than −60 dB.

Figure 4:
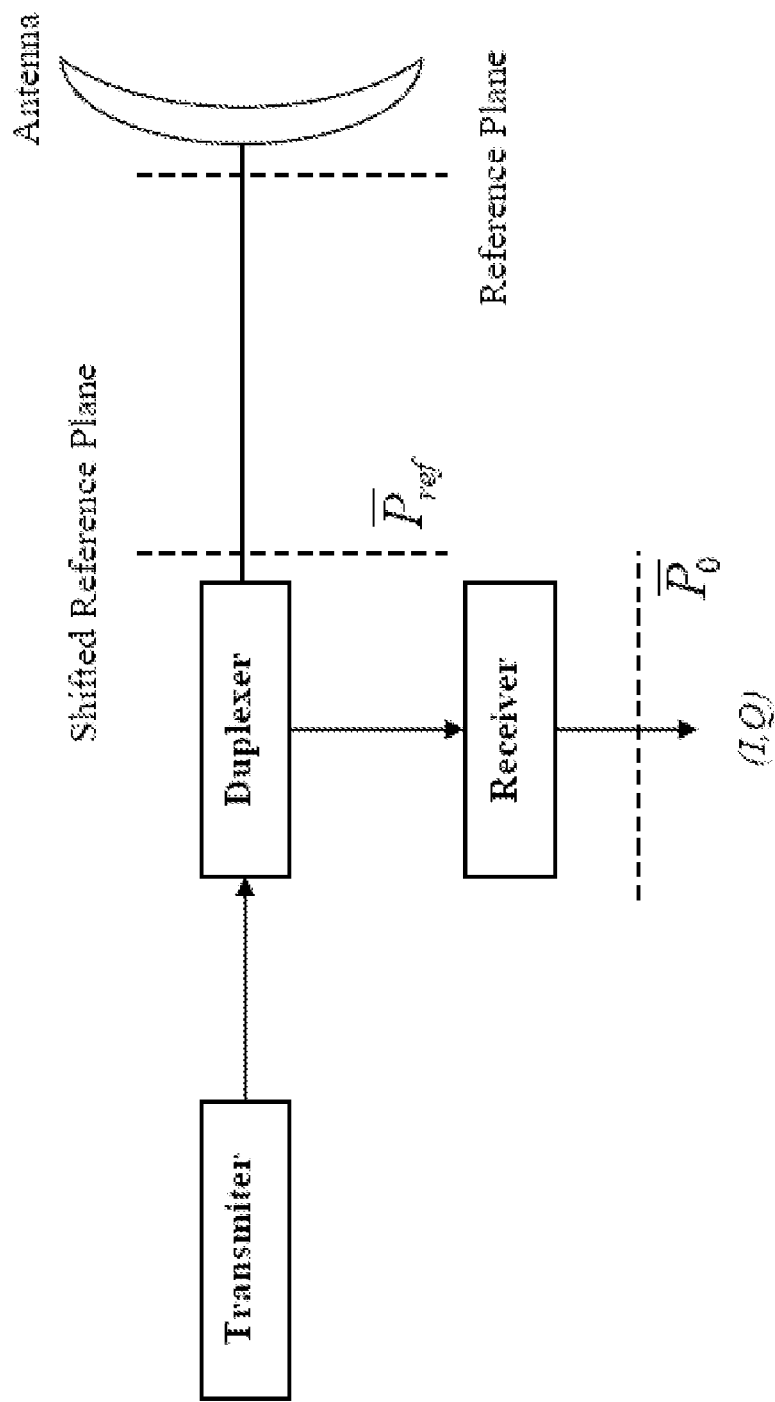
FIG. 4 shows an illustration of the shifted reference plane for reflectivity calculations according to some embodiments of the invention.

The reflectivity is estimated from the received power at the shifted reference plane, as shown in FIG. 4. The reflectivity can be given by, $$Z_e = C'R^2 \bar{P}_{ref}.$$

In the above equation $\bar{P}_{ref}$ is the received power at the reference port, R is the radar Range, and C' is a constant given by, $$C' = \frac{1}{\pi^5 |K_w|^2} \left(\frac{2}{c\tau}\right) \left[\frac{(4\pi^3 / l_{wg}^2)}{P_t G_0^2}\right] \left(\frac{8\ln 2}{\pi \theta_B \phi_B}\right) \lambda^2$$

The power at the reference plane is related to the power at the output of the receiver by $$\bar{P}_{ref} = \left(\frac{l_r}{G_r}\right) \bar{P}_0,$$

where $l_r$ is the receiver loss and $G_r$ is the receiver gain. Hence, the equivalent reflectivity can be computed from the receiver output power, $$Z_e = CR^2 \bar{P}_0$$

with $$C' = \frac{1}{\pi^5 |K_w|^2} \left(\frac{2}{c\tau}\right) \left(\frac{l_r}{G_r}\right) \left[\frac{(4\pi^3 l_{wg}^2)}{P_t G_0^2}\right] \left(\frac{8\ln 2}{\pi \theta_B \phi_B}\right) \lambda$$

The unit of $Z_e$ is mm$^2$m$^{-1}$. In practical, it is expressed in decibel scale (dBZ). The radar equation can now be written as, $$Z_e[\text{dBZ}] = \bar{P}_0[\text{dBm}] + C[\text{dB}] + 20\log(R[\text{km}])$$

The notations used in the above equations are explained in Bringi and Chandrasekar (2001).

The minimum detectable $Z_e$ at a given range R (km) is specified when the signal to noise ratio is unity, i.e. $\bar{P}_0 = P_N = kTB$ where B is the receiver equivalent noise bandwidth. Now, $$\min(Z_e)[\text{dBZ}] = 10\log(kTB) + C[\text{dB}] + 20\log(R[\text{km}])$$

From the above equations, it can be seen that there are several ways to improve the system sensitivity. For example, increasing the peak/average transmit power is an intuitive way. Transmitting signal with high power lets the radar system able to see weak echoes. However, arbitrary high power RF transmitters/amplifiers are not always available and are very expensive. The alternate approach is to design a receiver filter that can suppress noise but preserve signal power. Given the fact that pulse compression signal is wideband signal and has spectrum like white noise, it is easily to prove that using a conventional filter (e.g. LFP) to remove noise will also cut off a part of signal. Therefore the filter loss $l_r$ will increase. The system sensitivity cannot be improved by this technique. But embodiments described herein can provide an increase sensitivity.

For precipitation targets, signals from different range gates are zero-mean and uncorrelated. They are also independent of noise. The covariance matrix of the measured signal $$R_{yy} = \sum_{k=-(N-1)}^{N-1} P_{n+k} W_k + \sigma_N^2 I_n$$

where $p_{n+k}$ is the signal power at the $(n+k)^{th}$ gate. $W_k$ is a shifted version of W by k elements and the remainder is zero-padded, denoted by $W_k = \text{circ}(W, k)$. If k is positive, the values of W are shifted down and right. If k is negative, the values of W are shifted up and left. For example, $$W_1 = \text{circ}(W, 1) = \begin{bmatrix} 0 & 0 & \cdots & 0 \\ 0 & w_{1,1} & \cdots & w_{1,N-1} \\ \vdots & \vdots & \ddots & \vdots \\ 0 & w_{N-1,1} & \cdots & w_{N-1,N-1} \end{bmatrix} \text{ and}$$

-continued $$W_{-1} = circ(W, -1) = \begin{bmatrix} w_{2,2} & \cdots & w_{2,N} & 0 \\ \vdots & \ddots & \vdots & \vdots \\ w_{N,2} & \cdots & w_{N,N} & 0 \\ 0 & \cdots & 0 & 0 \end{bmatrix}.$$

For $m \leq N-1$, denote $X_m = [x_{n-m}, x_{n-m+1}, \ldots, x_{n+m-1}, x_{n+m}]^T$. We have $$R_{xx} = E(X_m X_m^H) = \begin{bmatrix} p_{n-m} & 0 & \cdots & 0 \\ 0 & p_{n-m+1} & \cdots & \vdots \\ \vdots & \vdots & \ddots & \vdots \\ 0 & 0 & \cdots & p_{n+m} \end{bmatrix}$$

Now, derive the estimator of $x_m$ can be derived that is conditioned in the observed vector $y_n$. The prior distribution only depends on the signal power. By definition, $$\widehat{x}_m = \arg_{x_m} \max f_{Y|X}(y_n | x_m) f_X(x_m)$$

The distributions of signals are multivariate normal, $$f_X(x_m) = \frac{1}{(2\pi)^{(2m+1)/2} \det(R_{xx})} \exp\left\{-\frac{1}{2} x_m^H R_{xx}^{-1} x_m\right\}$$

$$f_{Y|X}(y_n) = \frac{1}{(2\pi)^{N/2} \det(R_{zz})} \exp\left\{-\frac{1}{2}(y_n - S_m x_m)^H R_{zz}^{-1}(y_n - S_m x)\right\},$$

where $R_{xx}$ is shown above, $z = y_n - S_m x_m$ and;

$$R_{zz} = \sum_{k=-(N-1), |k|>m}^{N-1} p_{n+k} W_k$$

$$S_m = \begin{bmatrix} w_m & w_{m-1} & \cdots & w_0 & 0 & \cdots & 0 \\ w_{m+1} & w_m & \cdots & w_1 & w_0 & \cdots & 0 \\ \vdots & \vdots & \ddots & \vdots & \vdots & \ddots & \vdots \\ 0 & 0 & \cdots & w_{N-1} & w_{N-2} & \cdots & w_{N-m-1} \end{bmatrix}$$

$S_m = [N \times (2m+1)]$ matrix.

From these equations we can determine solve for the minima to obtain the estimator for $x_m$:

$$\widehat{x}_m = (S_m^H R_{zz}^{-1} S_m + R_{xx}^{-1})^{-1} S_m^H R_{zz}^{-1} y_n$$

Now, returning to the form $\widehat{x}_m = F y_n$, where $$F = (S_m^H R_{zz}^{-1} S_m + R_{xx}^{-1})^{-1} S_m^H R_{zz}^{-1}$$

is the adaptive filter for the second SES waveform.

This analysis does not account for Doppler shift; i.e. it sets all Doppler shifts of samples (range gate volumes) to zeros. Although radial Doppler of weather echoes is not as high as in case of military targets such as aircrafts it still affects the PSL performance of the receiver filter. Especially, weather radar systems need to measure precipitation echoes accurately. A strong, moving fast storm may heavily contaminate nearby weak cells due to the sidelobe problem. Therefore, when designing system, the signal Doppler needs to be taken into account.

Let $f_i$ be the Doppler corresponding to signal at sub-pulse gate i, the Doppler phase shift over a period of $T_s$ is $\theta_i = -2\pi T_s f_i$. Along with the power, the Doppler phase shift of the signal at gate $(n+k)^{th}$ has impact on the covariance matrix $R_{yy}$.

To account for that impact, the transmitted waveform matrix $W_k$ has to be replaced by its Doppler-modulated version:

$$W_k \to W_k^{mod} = \text{circ}(W^{(n+k)}, k)$$

where $W^i$ is the Doppler modulated version of W by the phase shift $\theta_i$ of sub-gate i.

$$W^i = (w^i)(w^i)^H$$

$$w^i = [w_0, w_1 e^{j\theta_1}, \ldots, w_{N-1} e^{j(N-1)\theta_i}]; j = \sqrt{-1}.$$

Figure 5A:
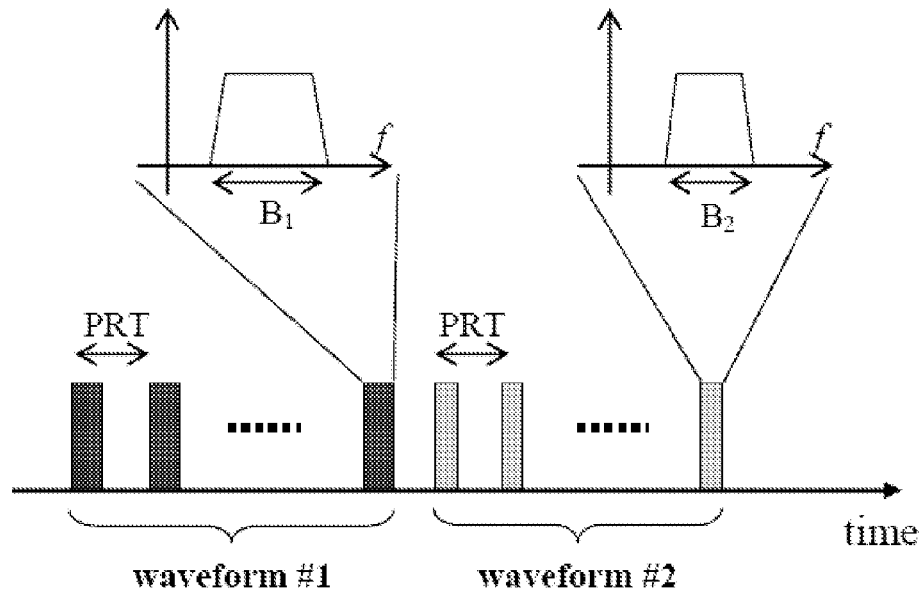
FIG. 5A shows a time-based sensitivity enhancement scheme according to some embodiments.
Figure 5B:
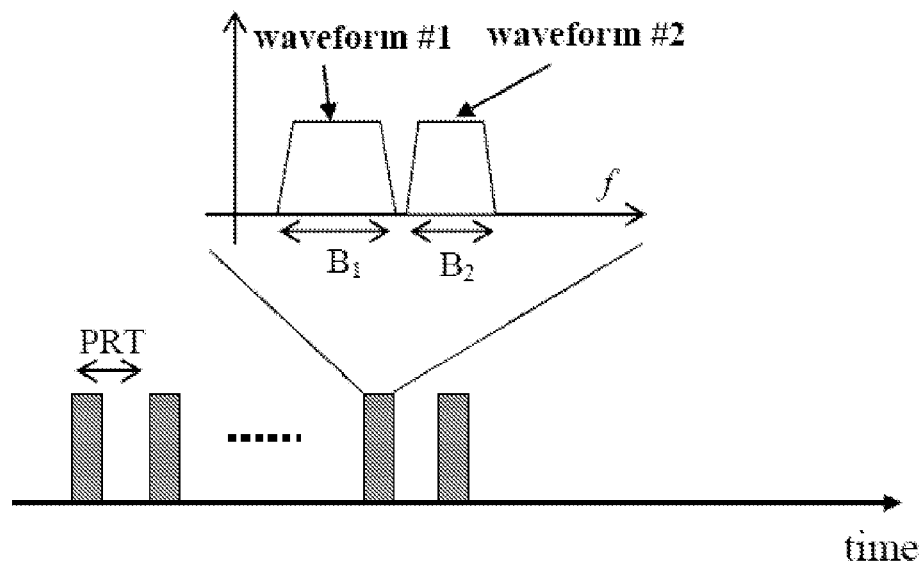
FIG. 5B shows a frequency-based sensitivity enhancement scheme according to some embodiments.

Embodiments of the invention can employ a dual-waveform scheme. Knowledge about the first signal can be used to derive a second signal that can provide increased sensitivity. The knowledge about the signal that can be used by the SES estimator can include the signal power and the signal Doppler. FIG. 5A shows a dual-waveform scheme where the first waveform, $B_1$, is separated in time from waveform $B_2$. And FIG. 5B shows a dual-waveform scheme where the first waveform, $B_1$, is separated in frequency from waveform $B_2$. In yet other configurations, the two waveforms can be separated in both time an frequency.

In embodiments where the two waveforms are transmitted simultaneously at different frequencies, the observed volume can be perfectly matched. If the two waveforms are transmitted at different times, the time difference can be selected to be small enough to ensure that the precipitation volume is statistically stationary. For example, when the two waveforms are transmitted in a sequence, as shown in FIG. 5A; the difference in transmission time between the two waveforms can be equal to the integration time for the first waveform. This can be of the order of ms. With that time apart, precipitation targets can be assumed to be unchanged. In some embodiments, the first waveform can be used to estimate detailed knowledge about the signal while the second waveform can be used to utilize that information to improve the system sensitivity. The second waveform, for example, can be designed with native resolution (i.e. inverse of the bandwidth) smaller than the practical resolution of the first waveform. By choosing adequate waveforms, embodiments of the invention can improve the system sensitivity efficiently.

This can be accomplished because the second waveform has smaller bandwidth so the noise entering to the system is reduced. And the second waveform estimator can use some information about the signal of interest. Although the estimated signal distribution from the first waveform may include some uncertainty, the SES filter can be adaptive to the signal level. That matching property can be important since it always provides better signal to noise ratio (SNR). For comparison, the conventional match filter when applied to weather radar is not really the match filter since precipitation targets are volume targets, received signal is not a time-frequency shifted version of the transmitted waveform.

Depending on the specification of the wanted system, the SES waveforms can be designed to transmit in time or in frequency domain. For a system with narrow available bandwidth, the two waveforms can be selected to transmit after each other in time. In such embodiments, both waveforms can use the whole available system bandwidth. In a system with bandwidth large enough, the two waveforms can be located at different frequencies within that band. Volume matching in this case can be good and/or dwell time can be reduced by half compared to the first case.

Figure 6A:
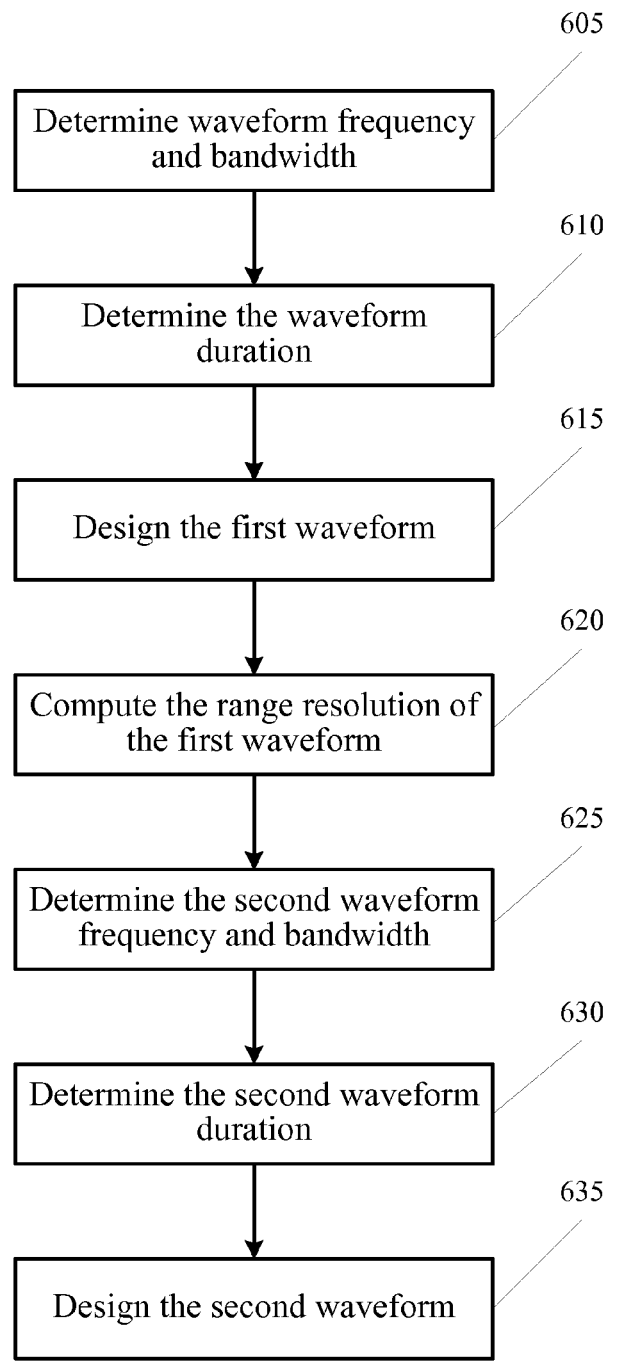
FIG. 6A is a flow chart outlining a method for selecting the first and second waveforms according to some embodiments of the invention.

FIG. 6 is a flow chart outlining a method for selecting the first and second waveforms. The selection of waveform parameters described below is example only. Various system specification and/or requirements can change these parameters; for example, the transmitter duty circle. At block 605 the frequency and/or bandwidth of the first and second waveforms are chosen. In some embodiments, the bandwidth of the second waveform can be selected to be two to four times less than the bandwidth of the first waveform.

At block 610, the duration of the waveforms is determined. In some embodiments, the first waveform duration can be set to be equal to or longer than the second waveform. Again, the selection depends on system specifications and/or design domains (e.g. waveforms can have either or both time diversity or frequency diversity). In some embodiments, the longer the second waveform the better the sensitivity that can be achieved. The second waveform filter can require $N_2$ samples before and after the wanted gate (where $N_2$ is the number of chirps within the second waveform). Increasing the length of the second waveform ($N_2$) can lessen the number of gate where the filter can be applied.

At block 615, the first waveform can be designed using any advanced method. The goal is to obtain the best performance in terms of resolution and PSL. This can be done by assigning pulse codes to the first waveform using any known pulse compression technique. At block 620 the range resolution of the first waveform can be computed from the effective bandwidth of the impulse response of the first waveform.

At block 625, the second waveform bandwidth can be determined. For example, it can be selected such as the corresponding range resolution (i.e. inverse of the bandwidth) is a multiple of the first waveform resolution (as calculated in block 615). Depending on the requirement of the final resolution; the multiplication factor can be selected appropriately. Next, the second waveform duration can be determined at block 630. Then, at block 635, the second waveform can be designed.

Figure 6B:
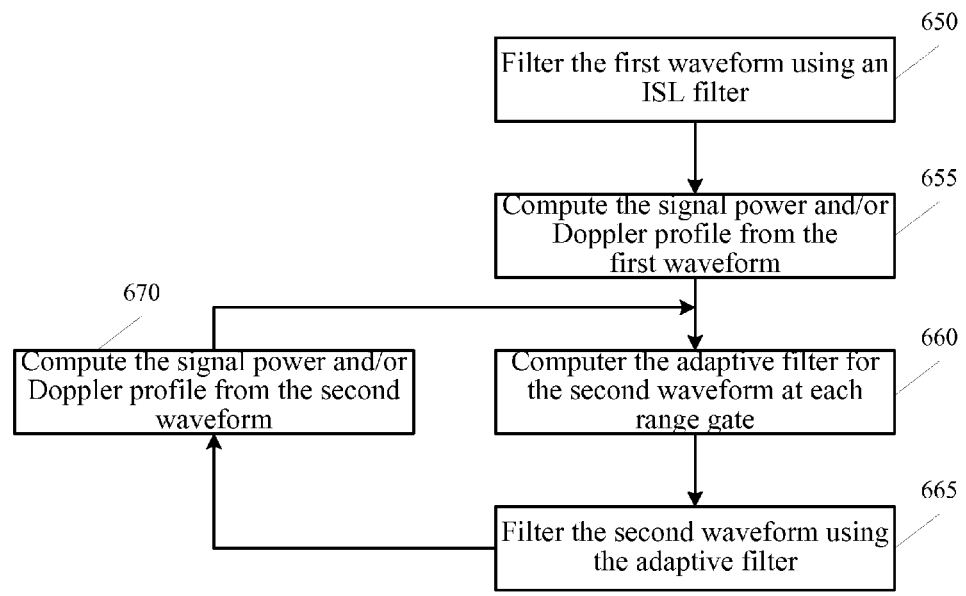
FIG. 6B is a flow chart outlining a method for calculating the adaptive filter for the second waveform and an iteration loop to update the reference power profile.

FIG. 6B is a flow chart outlining a method for calculating the adaptive filter for the second waveform according to some embodiments of the invention. This can be used to update the reference power profile. The signal power profile and Doppler profile can be estimated from the first waveform using an ISL filter. That is, the first waveform can be filtered using an ISL filter at block 650. From this filtered data, the signal power profile and/or the Doppler profile can be computed at block 655. These profiles can then be used as inputs to compute filter coefficients for the second waveform. That is, an adaptive filter can be computed for the second waveform at each range gate at block 660. This adaptive filter can then be used to filter the second waveform. To further improve the sensitivity of the system, an iteration loop can be introduced. Outputs of the second waveform can be used as reference profiles of the filter design phase for the second waveform itself at block 670. Using an iteration loop can help increases the estimated standard deviation and/or possibly reduces the number of range gates where the filter can be applied.

Figure 7:
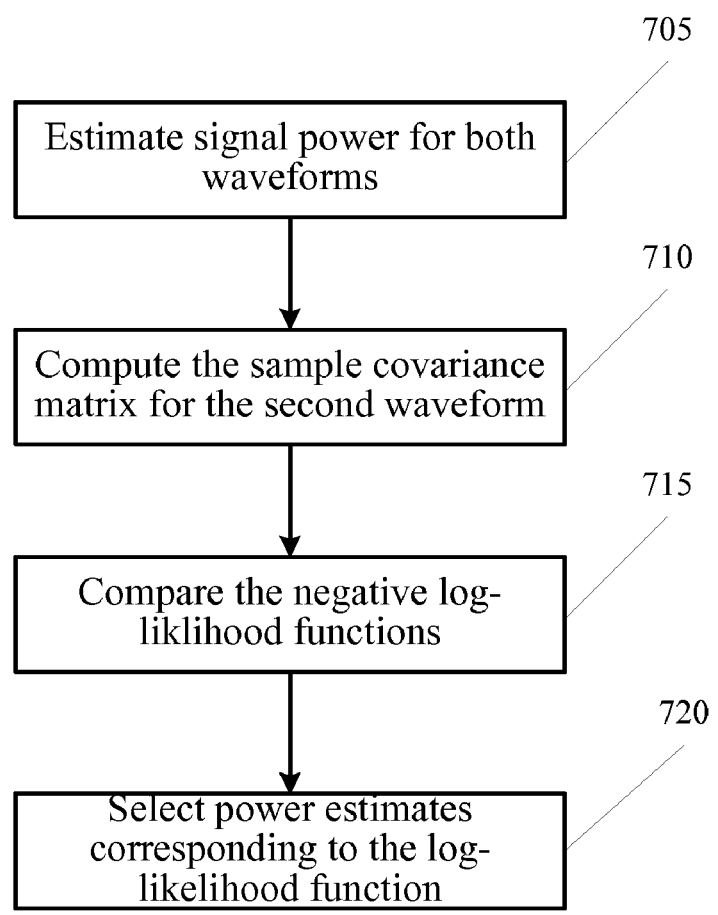
FIG. 7 is a flowchart outlining a checking procedure for two waveforms according to some embodiments of the invention.

With the SES, we have two products form the two waveforms. The second waveform's output has higher sensitivity. In case of strong echoes, the two waveform estimates are usually good; one may combine them to lower measurement errors. For example, this can be accomplished by taking the average of both products. In addition, an SES estimator can use the signal power as prior knowledge but its output may not converge to the true power. To mitigate this problem, a checking procedure based on the likelihood test can be used. The likelihood functions of two signal distributions can be compared: one with the first waveform power estimate and the other with the SES power from the second waveform. FIG. 7 shows a flowchart outlining this procedure.

At block 705 the signal powers for both waveforms can be estimated. At block 710, the sample covariance matrix of the signal can be calculated for the second waveform along range:

$$\hat{R}_n^{range} = \frac{\sum_1^{hits} y_n y_n^H}{hits}$$

where hits is number of samples for the second waveform. At block 715, the negative log-likelihood function values can be compared with power estimates from both waveforms. Powers that provide smaller value will be chosen.

$$L_n^{range} = \ln(\det(R_{yy})) + \text{trace}(\hat{R}_n^{range} \hat{R}_{yy}^{-1})$$

where $R_{yy}$ is shown above and $p_n$, is replaced by the two estimated powers. At block 720, power estimates corresponding to the log-likelihood function can be selected.

Figure 13A:
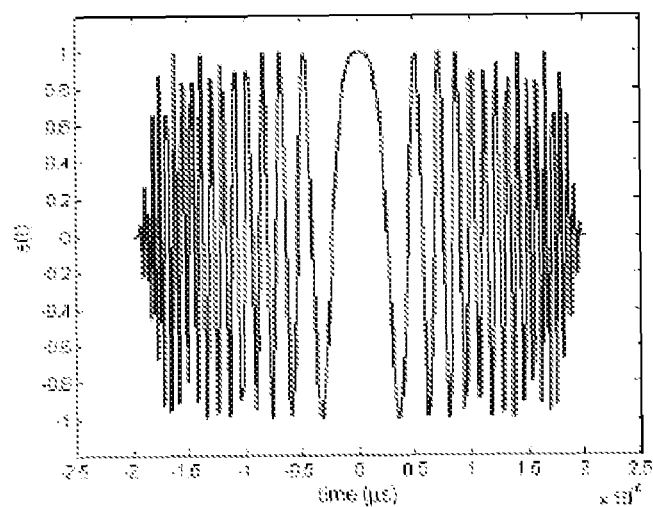
FIG. 13A shows an example of a first waveform according to some embodiments of the invention.
Figure 13B:
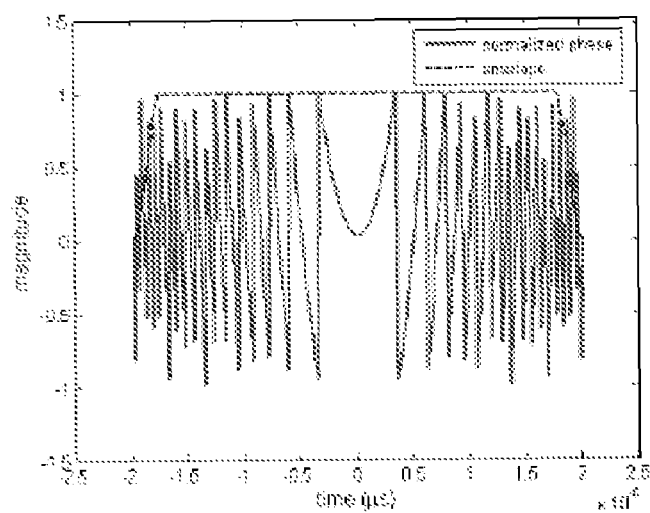
FIG. 13B shows an envelope and normalized phase of the first waveform shown in FIG. 13A.
Figure 14A:
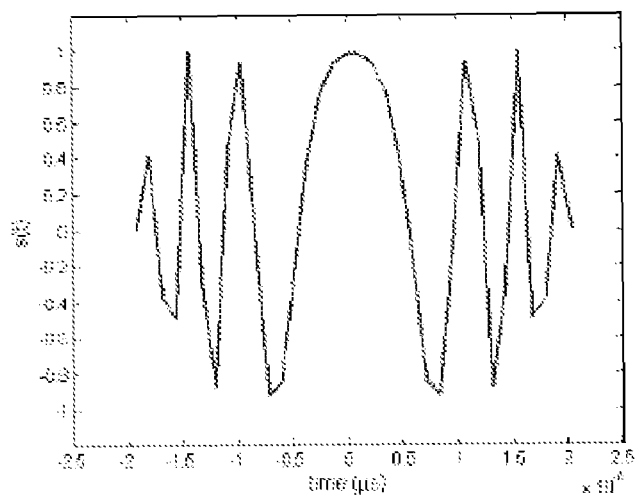
FIG. 14A shows an example of a second waveform according to some embodiments of the invention.
Figure 14B:
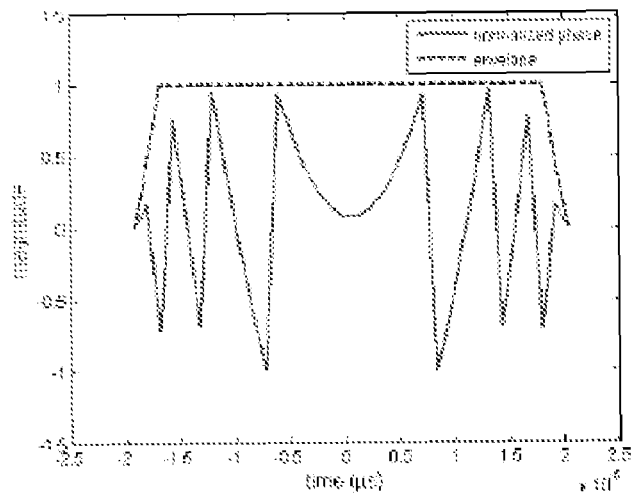
FIG. 14B shows an envelope and normalized phase of the second waveform shown in FIG. 13A.

Some embodiments of the invention can be verified using pulse compression simulation data. For example, input profiles for the simulation are simulated precipitation range profiles and based on actual measurements from Collaborative Adaptive Sensing of the Atmosphere Integrative Project 1 (CASA IP1). The simulation was done with the impact of Doppler included. Simulation input parameters are listed in the Table 1. The waveforms used in this simulation are shown in FIGS. 13 and 14.

| f (GHz) | PRF (MHz) | hits | $F_s$ (MHz) | $T_1$ (µs) | $T_2$ (µs) | $B_1$ (MHz) | $B_2$ (MHz) | NF (dB) | G (dB) |
|---|---|---|---|---|---|---|---|---|---|
| 9.41 | 3.2 | 54 | 5 | 40 | 40 | 4 | 0.83 | 4.5 | 43 |

Figure 8:
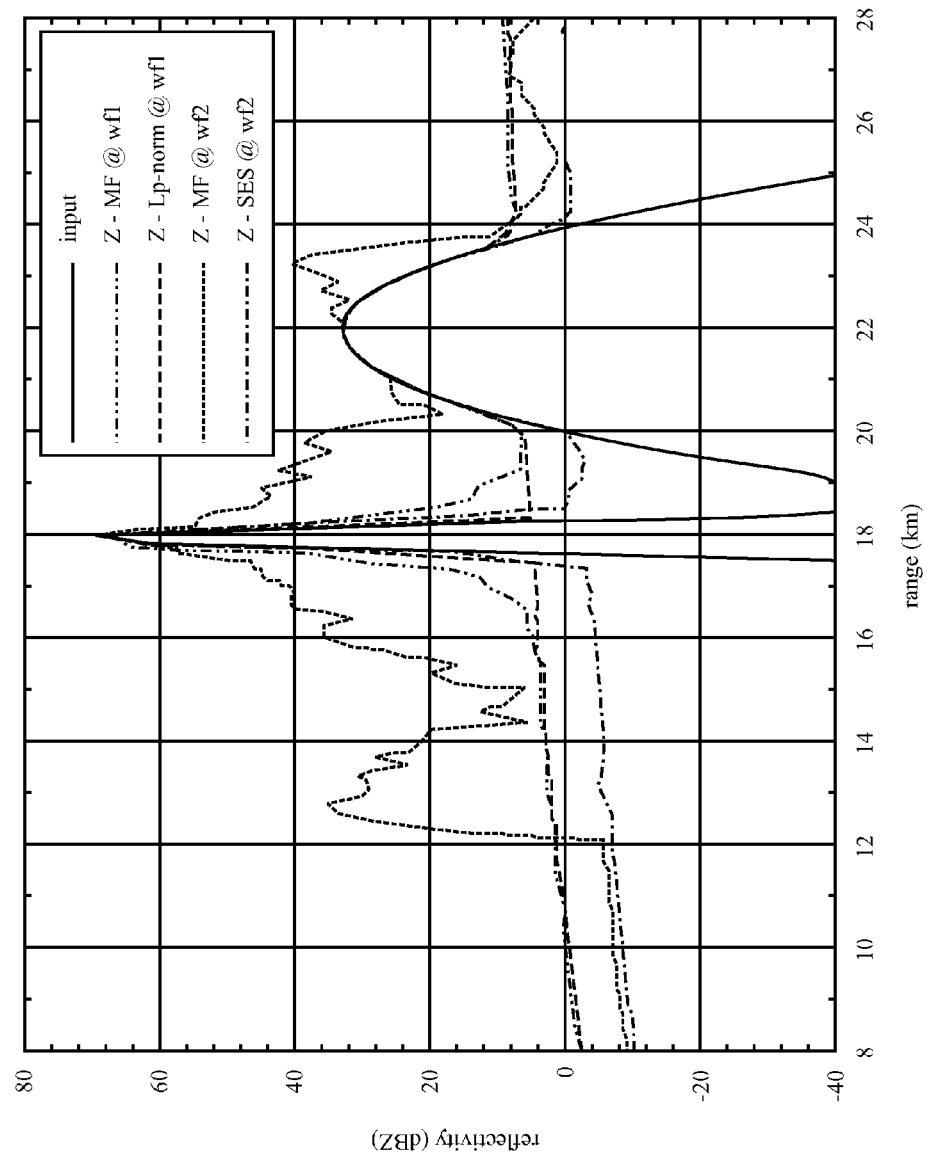
FIG. 8 shows a Gaussian shaped power profile of true power, SES power and MF power.

A match filter (MF) was also applied to the simulation data for comparison purposes. In FIGS. 8 to 11, signals from a MF system are averaged in range to have the same resolution as provided by the SES. In FIG. 8 a precipitation range profile is simulated as the sum of two Gaussian shaped echoes. The echo with narrow width is similar to an impulse while the second echo shows a high gradient in power.

FIG. 8 shows the output of a match filter (MF) for the both waveforms. Output from a match filter for the second waveform has relatively good sensitivity but is bad in terms of resolution and/or PSL, as expected for a waveform with the pulse compression ratio (BT) of only 33. Therefore, from this point, SES is compared to the MF output at the first waveform. FIG. 8 also shows that the SES can detect a weaker signal than the MF system. In addition the SES has PSL larger than 60 dB even at Doppler velocity of 25 m/s. These simulation results show about 8 dB improvement in sensitivity. If noise subtraction is applied, then a SES shows about 10 dB of improvement. In addition, SES can improve sensitivity by introducing an iterative procedure to update the reference profiles of SES.

A more detailed analysis on bias and standard deviation of power estimate was done on a trapezoid profile with gradient of 40 dB/km. FIG. 9A compares the retrieve power profile, and FIG. 9B shows the bias and the standard deviation of SES. Even in this extreme case, the SES provides a good power estimate with bias less than 1 dB at most locations and standard deviation of less than 2 dB.

SES has also been tested with simulation of real profiles measured by CASA IP1 Cyril radar during a tornado event that happened in Oklahoma on Feb. 10, 2009. The only modification is that the power profiles were lowered by 20 dB for sensitivity testing purpose. All other profiles are kept as is. FIGS. 9A and 9B, are examples for one profile at azimuth of 330 deg. In FIG. 10, due to less sensitivity, MF system has more bias compared to the SES. To quantify how much gain the SES enhances over MF system, the signal-to-noise ratios (SNR) of the two systems are calculated. For the same transmitted power and pulse width, signal from the SES has a higher SNR compared to one from MF system. For example, an 8.9 db average improvement is shown in FIG. 11B, where the pulse width is 40 µs.

Figure 10A:
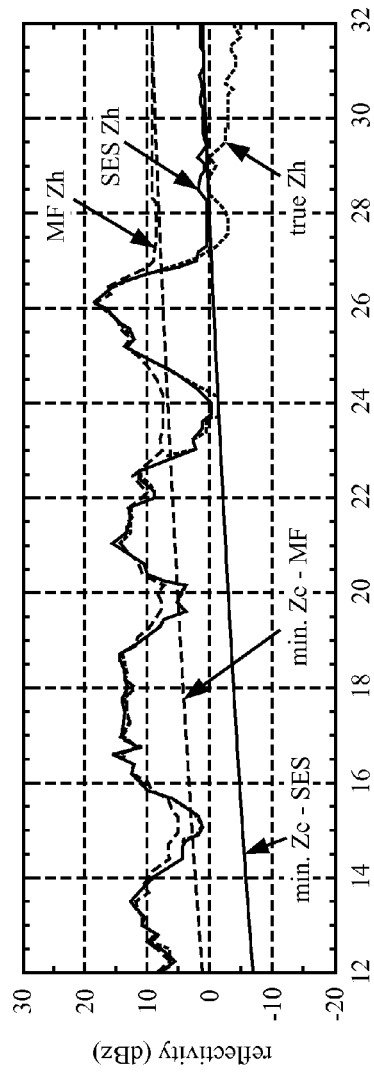
FIG. 10A shows a graph of received reflectivity for both MF and SES according to some embodiments of the invention.
Figure 10B:
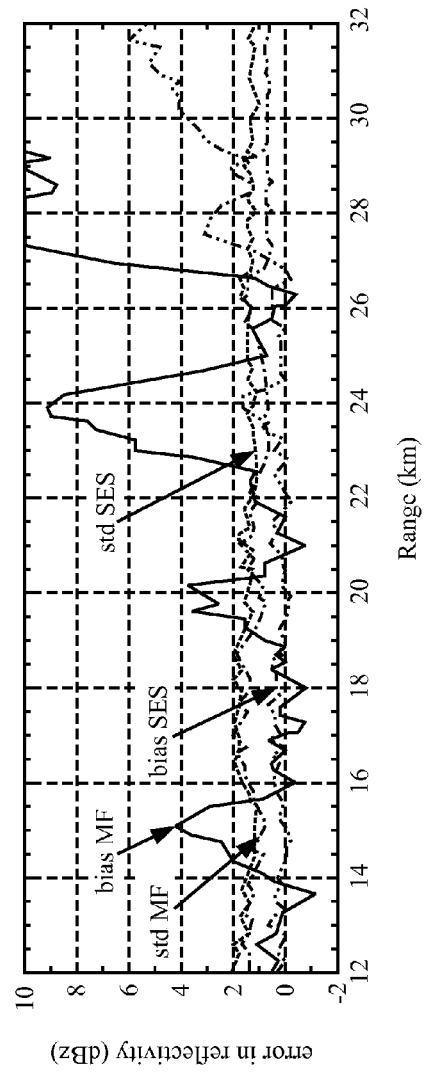
FIG. 10B shows a graph of the bias and standard deviation of SES power according to some embodiments of the invention.
Figure 11A:
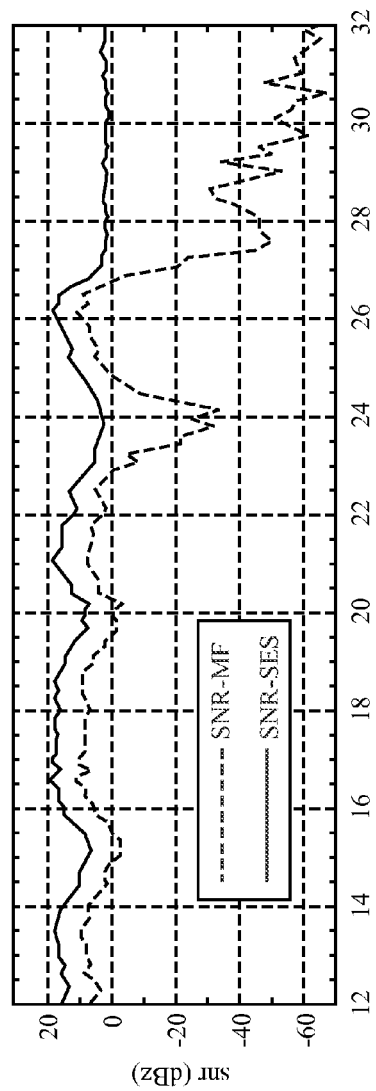
FIG. 11A compares SNR profiles from MF and SES systems according to some embodiments of the invention.
Figure 11B:
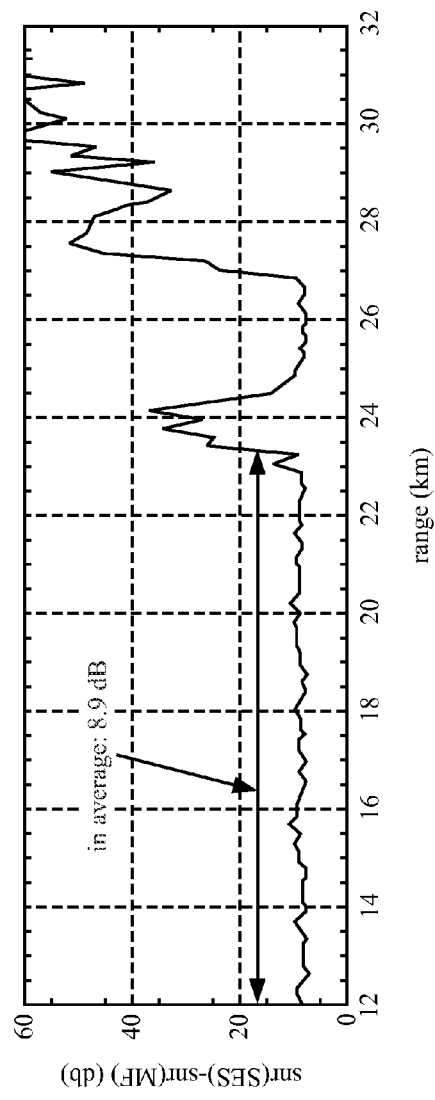
FIG. 11B shows the SNR difference between MF and SES shown in FIG. 11A.

In FIG. 10A a the received reflectivity profiles for MF and SES of a Cyril radar profile at azimuth of 330 deg is shown. And FIG. 10B the bias and standard deviation of the Cyril radar profile are also shown. FIG. 11A shows the SNR profiles from MF and SES. And FIG. 11B shows the SNR difference between the two.

Figure 12A:
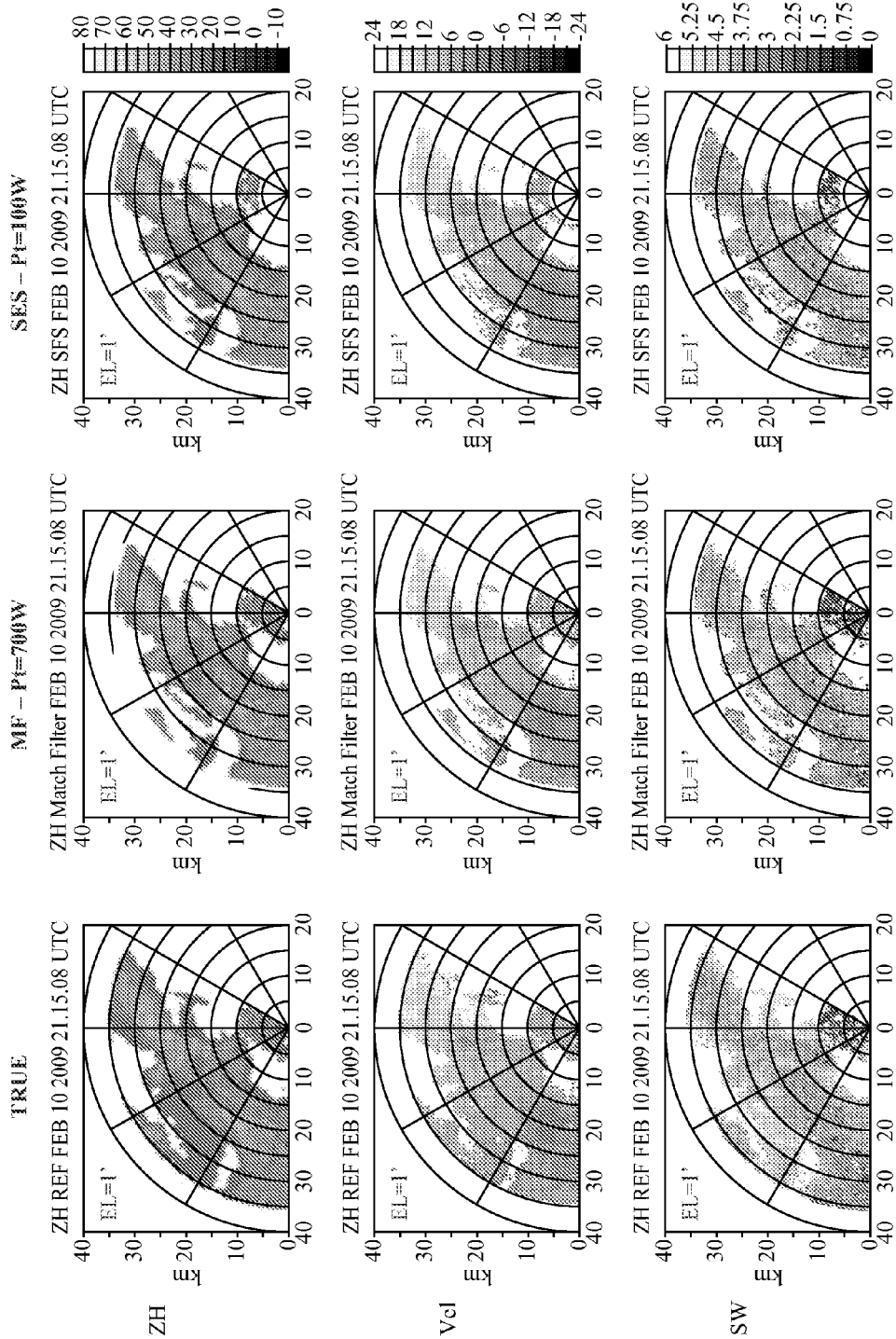
FIGS. 12A and 12B show the comparison of PPI data for true data, MF data and SES data using various embodiments described herein.
Figure 12B:
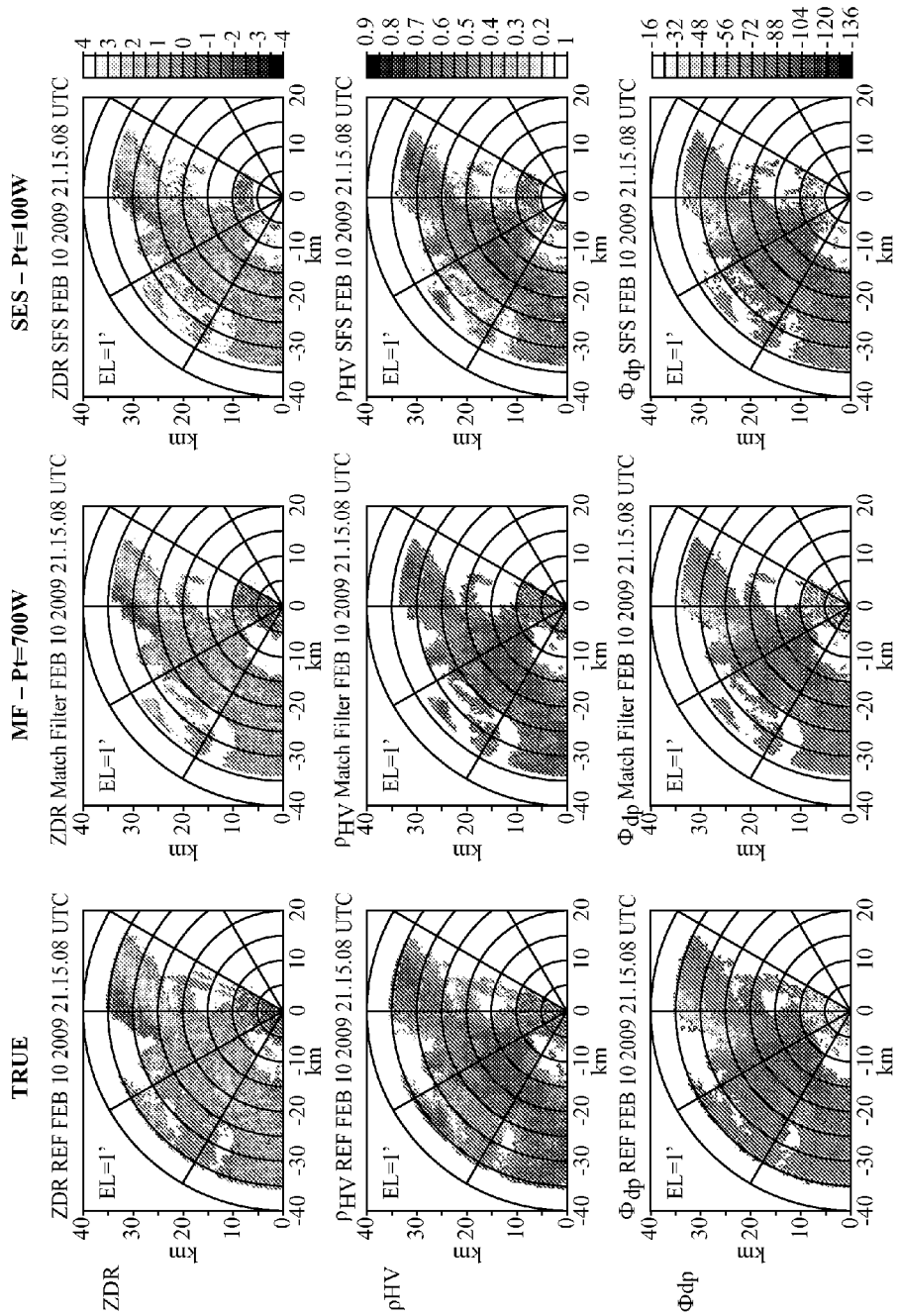

In FIGS. 12A and 12B PPI data from Cyril radar are used as the input for the SES simulation. The averaged transmitted power for the SES is 100 W and for MF system is 700 W. Signal 14 spectral moments and dual-polarization parameters are estimated using a standard method with noise subtraction. As can be observed, the SES with 100 W transmitted power provides results comparable to the ones from MF system with 700 W transmitted power. Therefore, in this case, the gain in sensitivity is about 7 times or 8.45 dB.

Circuits, logic modules, processors, and/or other components may be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While many of the figures are described with reference to particular blocks, it is to be understood that the blocks are defined for convenience of description and are not intended to imply a particular physical arrangement of component parts. Further, the blocks need not correspond to physically distinct components.

While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or digital versatile disk (DVD), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

What is claimed is:

1. A weather radar system comprising:
   a transmitter configured to transmit a first waveform and a second waveform into a region of interest, wherein the first waveform and the second waveform are different and/or independent from one another;
   a receiver configured to receive first echoes and second echoes scattered from the region of interest, wherein the first echoes correspond with the first transmitted signal and the second echoes correspond with the second transmitted signal; and
   a computer system coupled at least with the receiver, wherein the computer system is configured to filter the second echoes based on information about either or both the first waveform and the first echoes.

2. The weather radar system according to claim 1, wherein the first and second waveforms comprise pulse compression waveforms.

3. The weather radar system according to claim 1, wherein the first waveform and the second waveform are transmitted at the same time and they are different in frequency.

4. The weather radar system according to claim 1, wherein the first waveform and the second waveform are transmitted at different times and they are different in time.

5. The weather radar system according to claim 1, wherein the second waveform is adaptively filtered based on the first waveform.

6. The weather radar system according to claim 1, wherein the second waveform is filtered based on the power of the first waveform.

7. The weather radar system according to claim 1, wherein the second waveform is filtered based on the Doppler profiles of the first waveform.

8. The weather radar system according to claim 1, wherein the filtering filters the second waveform using $F=(S_m^H R_{zz}^{-1} S_m + R_{xx}^{-1})^{-1} S_m^H R_{zz}^{-1}$.

9. The weather radar system according to claim 1, wherein the computer system is configured to iteratively use the outputs of the second waveform as a reference profile to compute the filter for the second waveform itself.

10. The method according to claim 1, wherein the computer system uses an iteration loop that uses the outputs of the second waveform as reference profiles to compute the filter for the second waveform itself.

11. A method for increasing the sensitivity of a radar system, the method comprising:
    transmitting a first waveform into the atmosphere from a weather radar system;
    transmitting a second waveform, different and/or independent from the first waveform, into the atmosphere from the weather radar system;
    receiving echoes from the atmosphere in response to the first waveform and the second waveform; and
    filtering echoes of the second waveform based on information about either or both the first waveform and the echoes from the first waveform.

12. The method according to claim 11, wherein the first waveform and the second waveform are transmitted at the same time and they are different in frequency.

13. The method according to claim 11, wherein the first waveform and the second waveform are transmitted at different times and they are different in time.

14. The method according to claim 11, wherein the bandwidth of the second waveform is less than the bandwidth of the first waveform.

15. The method according to claim 11, wherein the filtering filters the second waveform using the filter: $F=(S_m^H R_{zz}^{-1} S_m + R_{xx}^{-1})^{-1} S_m^H R_{zz}^{-1}$.

16. The method according to claim 11, wherein the first and second wave comprise pulse compression waveforms.

17. A method for designing waveforms for a dual-waveform weather radar system, the method comprising:

- determining, by a computer system, the frequency and bandwidth of the first waveform and the second waveform;
- determining, by a computer system, the duration of the first waveform and the second waveform;
- assigning, by a computer system, pulse codes to the first waveform;
- computing, by a computer system, the range resolution of the first waveform;
- determining, by a computer system, the bandwidth of the second waveform from the range resolution of the first waveform; and
- assigning, by a computer system, pulse codes to the second waveform.

18. The method according to claim 17, wherein the bandwidth of the second waveform is less than the bandwidth of the first waveform.

19. The method according to claim 17 wherein the bandwidth of the second waveform is selected such that the range resolution of the second waveform is an integer multiple of the range resolution of the first waveform, wherein the range resolution is the inverse of the bandwidth.

20. The method according to claim 17 further comprising; transmitting the first waveform and the second waveform into a region of interest.

* * * * *